Nov. 18, 1924.  
I. L. EDWARDS  
1,515,940

WHEEL FOR AUTOMOBILES, ETC

Filed Nov. 7, 1919  2 Sheets-Sheet 2

Inventor  
Isaac L. Edwards,  
by Chas. J. Williamson  
Atty.

Patented Nov. 18, 1924.

1,515,940

UNITED STATES PATENT OFFICE.

ISAAC L. EDWARDS, OF AURORA, ILLINOIS.

WHEEL FOR AUTOMOBILES, ETC.

Application filed November 7, 1919. Serial No. 336,259.

*To all whom it may concern:*

Be it known that I, ISAAC L. EDWARDS, of Aurora, Illinois, have invented a certain new and useful Improvement in Wheels for Automobiles, Etc., and do hereby declare that the following is a full, clear, and exact description thereof.

The object of my invention is to provide a wheel especially suited for automobiles or motor vehicles, which will be of such construction of hub and rim parts that assemblage and dismantling will require but a minimum of labor, time and tools, and which nevertheless will stand the severest usage, and run smoothly, without wabbling, and with a minimum of wear, and of ready and efficient adjustment to compensate for unavoidable wear.

In the drawings:—

Fig. 5 is a side view of a portion of the hub from the inside;

Fig. 6 is a view similar to Fig. 1, of a form of my invention, using rigid spokes;

Fig. 7 is a detail view in section on a line transversely of the felly shown in Fig. 6 with a portion of the hub and adjacent parts shown in section.

Figure 1:
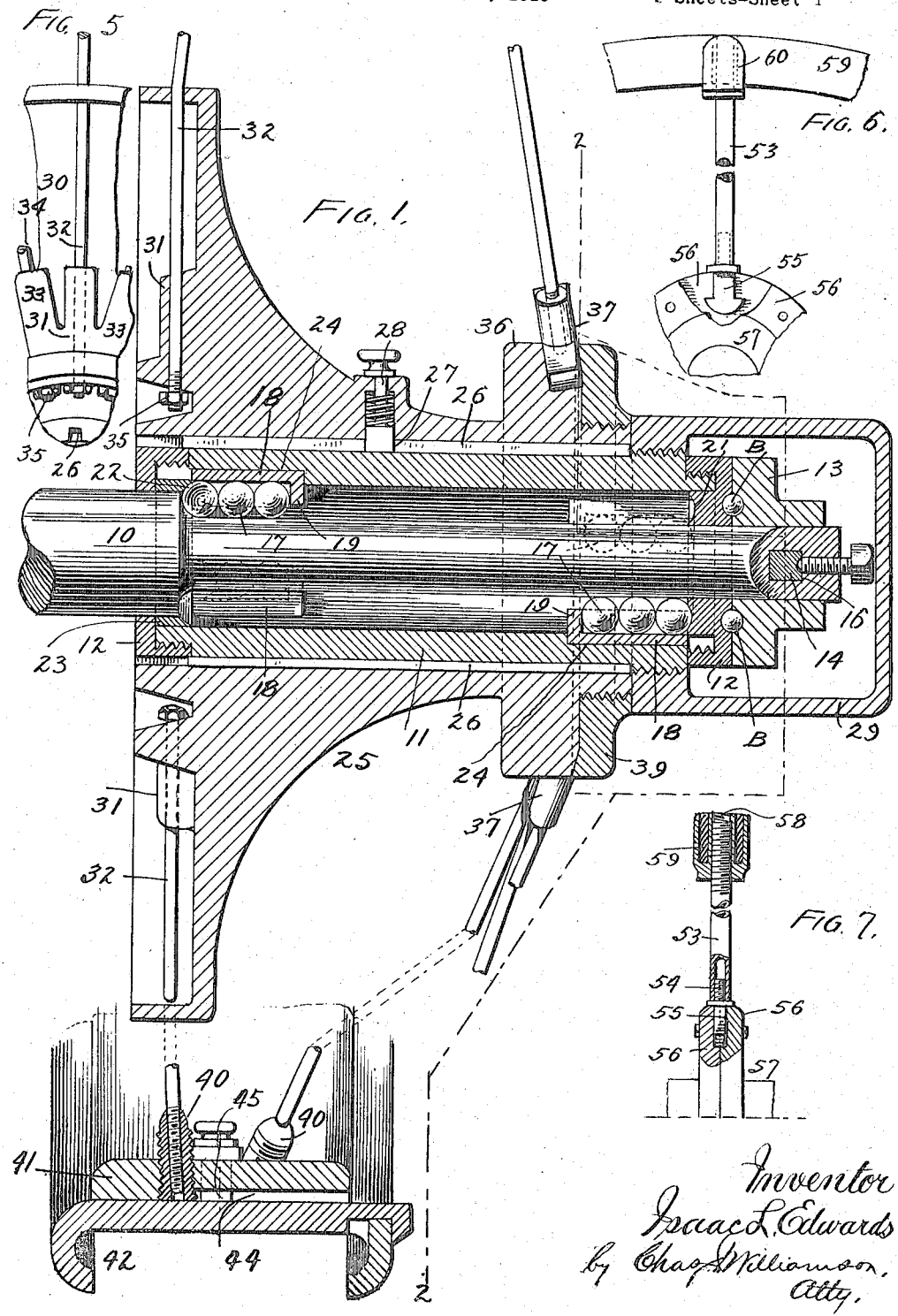
Fig. 1 is a vertical section parallel with the wheel axis, of a wire spoke wheel embodying my invention.

Beginning my description with the hub and axle, and referring to Figs. 1 to 5, the axle 10 is shown as cylindrical (though it can be tapering and the box 11 is likewise cylindrical with a ring 12, screwed upon each end and closely fitting the axle. Upon the outer end of the axle is a collar 13, which is secured thereto by a diametrical pin or key 14 that passes through diametrically alining slots 15 in the collar and a hole 16 in the axle, and said key is secured by a screw 17 that engages a threaded axial hole in the axle, said screw serving as a means for endwise adjustment of the parts to compensate for wear. A thrust antifriction bearing is provided between adjacent sides of the collar 13 and the outer box ring 12 by means of balls B, in a race formed half in collar and half in ring.

Between the opposing peripheral surfaces of axle and box, I provide anti-friction bearings that consist of two groups of balls 17, one group near each end, and each of the members of each group being equi-distant apart around the axle, and the members of one group situated opposite the spaces between the members of the other group so that the box is supported adequately against any tendency to wobble. Each member of a group consists of a series of balls that extend parallel with the axle, and thereby an extended support, axially, is provided. The balls of a series are confined in a cage that consists of a block 18 with a longitudinal groove that is closed at its inner end by a wall 19, and is open at its outer end, or the end next the box ring 13 so that the outer ball runs in a race that in one case is a groove 21 in the outer ring 12, and in the other case a groove 22 in a ring 23 that is confined between the inner box ring 13 and the balls at that end of the box. Preferably, the blocks 18 are removable, for repair, for which purpose each fits a dove-tail groove 24 in the inner wall of the box, but they may be integral with the box if desired.

Fitting the axle box is the hub 25, the box having two diametrically opposite keys 26 on its periphery, extending lengthwise thereof, and the interior of the hub having grooves that receive said keys and thus hub and box are splined together. One of the keys has, at or near mid-length, a notch 27 that receives a locking device, which may be a screw, but is preferably a spring latch 28 that is seated in a radial hole in the hub, having a head outside for convenient manipulation, and thereby hub (and wheel) are efficiently secured against axial movement on the box, but in a manner that permits most ready removal of wheel when necessary. At its outer end, the hub is engaged by the inner end of a hub cap 29 that screws upon the box, and houses the box and axle parts at the outer end.

The hub has at its inner end an annular flange 30 which on its inner face has a circular series of hollow, spoke-receiving lugs 31, consisting of groups of three, the middle one being radial, so that the spoke 32 therein takes strain wholly in an endwise direction and each outer lug 33 is tangential, for a tangential spoke 34. The spokes can be screwed in the lug holes, and supplied with nuts 35 on their inner ends.

At its outer end, the hub has an annular flange 36 to which are secured a circular series of spoke receiving blocks 37, each as in the case of the lugs 31, being provided with a triune group of threaded, spoke-receiving holes, the middle hole 38 being radial and each outer hole tangential. Each block 37 has a T-shaped inner end that interlockingly fits a correspondingly shaped recess or slot 38 in the face of the flange 36, and the blocks are engaged on their outer sides by a ring 39 that is screwed on the outer end of the hub, and which being overlapped by the hub cap end, is locked by the latter. The blocks 37 are slanted at an angle corresponding to the angle of the spokes, so as to avoid bending the latter at the hub ends, and opposing, block-engaging faces of flange 36 and ring 39 are correspondingly inclined to give a fair bearing on the blocks.

At the outer end, each spoke is threaded to engage a threaded hole in a nipple 40 that is externally threaded to screw into a threaded hole in the felly 41.

The rim 42 is demountable. At any desired number of points on its inner periphery, it has inwardly projecting lugs 43 each adapted to interlock with a slot or recess 44 in the outer periphery of the felly, said recess being L-shaped in plan view, one leg of the slot extending from the edge of the felly inward to the center and the other leg extending circumferentially and of a size to receive the rim lug. Connection and separation of felly and rim are effected by successive axial and rotary movement of the parts. When the lug is seated in the inner short leg of the slot, it is locked therein by a suitable latch, which may be a spring latch 45, similar to the hub latch. The lug can be square, or round in form.

The rim has as usual, an integral tire-engaging annular flange on one edge, and on the other edge a removable tire-engaging annular flange 46, which consists of a ring of semicircular sections jointed at diametrically opposite points by screws 47 that pass through holes in the overlapping extremities of the sections. One of the joints forms a pivotal connection on which the ring sections can swing when the screw of the other joint is removed, for the purpose of releasing the tire, or engaging it; or if desired both screws can be removed to release the tire. The overlapping extremities at the non-hinging point are made to interlock by a rib 48 on the outer lap and a corresponding recess in the under lap in which said rib seats, and preferably the engaging edges of rib and recess are inclined, or oblique to add to the firmness of the joint. To facilitate drawing the overlapping ends together, I provide a hole 49 in the outer lap and a cavity 50 in the under lap, so that by inserting a tool, such as a punch, through said hole 49 and engaging its end with the cavity 50, it can be used as a lever, or pry, to pull the overlapping ends until the screw holes therein aline.

At equi-distant intervals, the removable ring is overlapped on its outer side by lugs 51 on the rim 42, the inner edge of the ring being provided with notches 52 to fit the respective lugs, the ends of the notches, in each case being shaped on such an angle or curve with the hinge joint as a center of motion, that lugs and notches will smoothly clear when the ring sections are opened and closed.

It will be seen that I employ no bolts and nuts anywhere in my hub or rim construction, and but few screws, but the parts are strongly held together, and can be most quickly, easily and conveniently assembled and taken apart.

Figure 2:
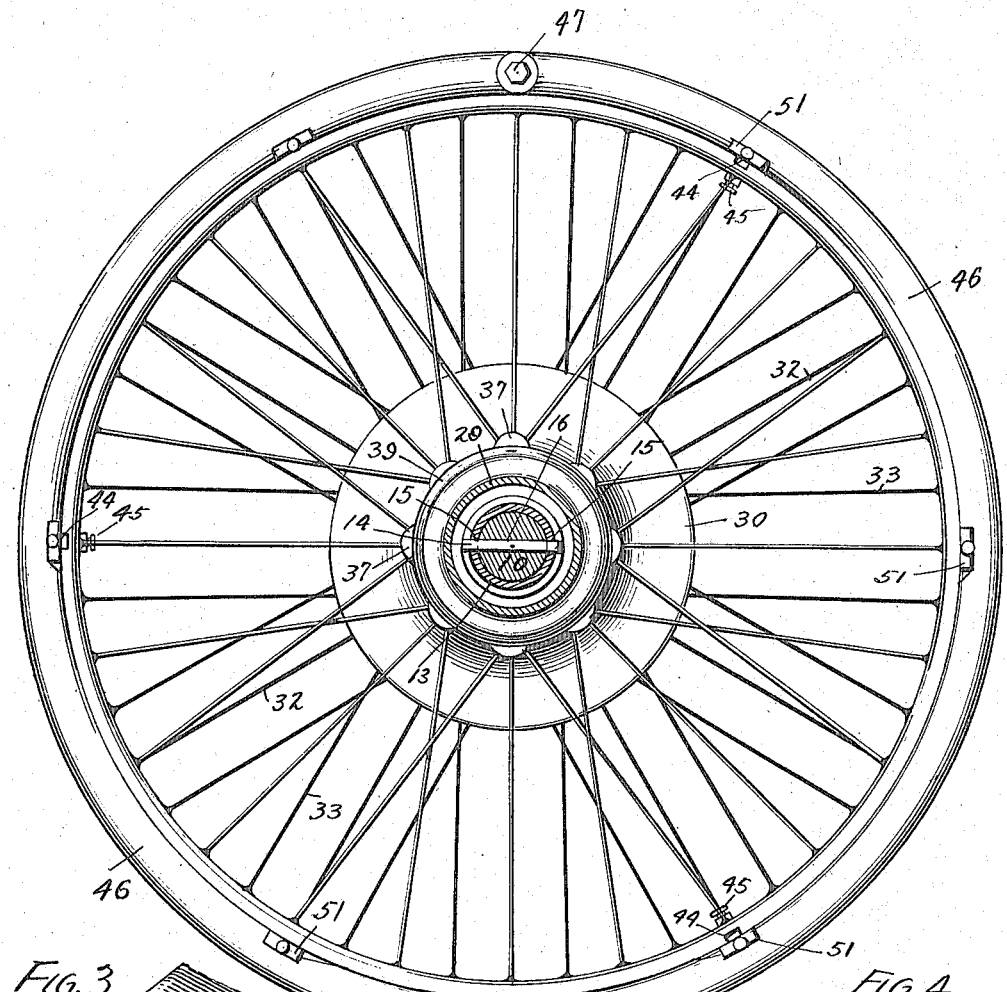
Fig. 2 is a section on the line 2—2 of Fig. 1.
Figure 3:
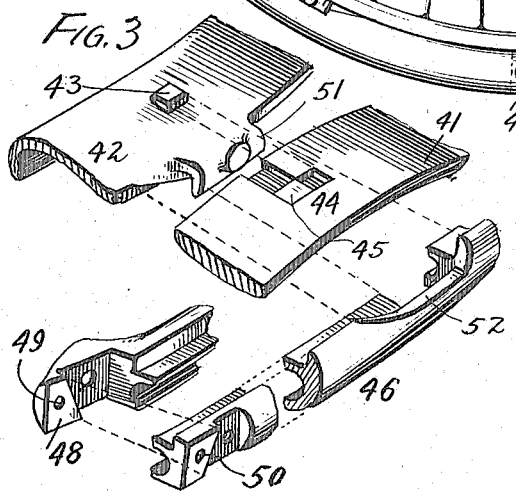
Fig. 3 is a perspective view of portions of the rim parts, shown separated the felly being shown in an inverted position with reference to the rim and the extremity of one portion of the removable tire engaging flange being turned around and to one side of its normal position to show the configuration of the inner side thereof.
Figure 4:
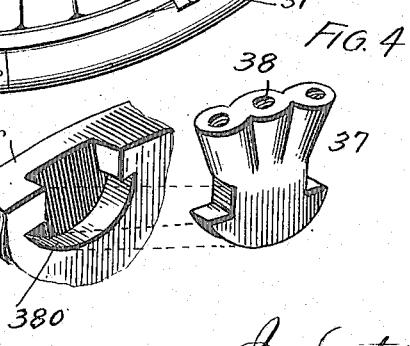
Fig. 4 is a like view of the front spoke attaching means.

In the form of my invention shown in Figs. 6 and 7, the spokes 53 are tubes or gas pipe sections which, at the inner end are internally threaded to screw upon a threaded stud 54 projecting radially from a block 55 corresponding to the blocks of Figs. 1 and 2, clamped between flanges 56 of the hub 57, each of which has recesses with which the blocks interlock as in Figs. 1 and 2. The spokes at their outer ends are externally threaded and engage internal thread on a thimble 58 inserted in a radial hole in the felly 59, said thimble having attached at its inner end, two side ears 60 that overlap the felly on opposite sides and thus brace and strengthen the same. The hub has an internal construction similar to that of the hub shown in Fig. 1.

I claim:—

1. A wheel having a rim with a tire-engaging flange formed of jointed ring sections, at least one of the joints being openable, and another one serving as a hinge each joint consisting of overlapping portions and a screw passing through the overlapped portions.

2. A wheel having a rim with a tire-engaging flange formed of jointed ring sections, at least one of the joints being openable, and another one serving as a hinge, said rim and ring having interlocking lugs and notches, the lugs overlapping the outer side of the part having the notches.

3. A wheel having a rim with a tire-engaging flange formed of jointed ring sections, at least one of the joints being openable, and another one serving as a hinge, and means at the openable joint for the application of a tool to pull the joint ends together, said openable joint having overlapping portions and said means comprising a hole in the outer lap and a cavity in the inner lap, such tool being insertable in said hole.

In testimony that I claim the foregoing I have hereunto set my hand,

ISAAC L. EDWARDS.